United States Patent
Smith et al.

(10) Patent No.: US 10,552,638 B2
(45) Date of Patent: Feb. 4, 2020

(54) INTEGRITY PROTECTION OF A MANDATORY ACCESS CONTROL POLICY IN AN OPERATING SYSTEM USING VIRTUAL MACHINE EXTENSION ROOT OPERATIONS

(71) Applicant: Intel Corporation, Santa Clara, CA (US)

(72) Inventors: Ned M. Smith, Beaverton, OR (US); Manohar R. Castelino, Santa Clara, CA (US); Harshawardhan Vipat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 14/757,948

(22) Filed: Dec. 24, 2015

(65) Prior Publication Data
US 2016/0335429 A1    Nov. 17, 2016

Related U.S. Application Data

(60) Provisional application No. 62/161,098, filed on May 13, 2015.

(51) Int. Cl.
*G06F 21/62*     (2013.01)

(52) U.S. Cl.
CPC ................ *G06F 21/6281* (2013.01)

(58) Field of Classification Search
None
See application file for complete search history.

(56) References Cited

U.S. PATENT DOCUMENTS

| | | |
|---|---|---|
| 5,500,811 A | 3/1996 | Corry |
| 6,144,710 A | 11/2000 | Chen et al. |
| 6,650,699 B1 | 11/2003 | Tierno |
| 8,671,448 B1 | 3/2014 | Tirosh et al. |
| 8,701,157 B1 * | 4/2014 | Wilson .............. H04L 63/08 726/1 |
| 8,904,472 B2 | 12/2014 | Shaikh et al. |

(Continued)

FOREIGN PATENT DOCUMENTS

| | | |
|---|---|---|
| WO | 2005008374 A2 | 1/2005 |
| WO | 2014210366 A1 | 12/2014 |

(Continued)

OTHER PUBLICATIONS

International Search Report and Written Opinion for International Patent Application No. PCT/US2016/026121, dated Jul. 27, 2016, 11 pages.

(Continued)

*Primary Examiner* — Henry Tsang
(74) *Attorney, Agent, or Firm* — Jordan IP Law, LLC

(57) ABSTRACT

Systems, apparatuses and methods may provide for conducting a signature verification of a mandatory access control policy and provisioning the mandatory access control policy into kernel memory if the signature verification is successful. Additionally, the kernel memory may be protected from unauthorized write operations by one or more processes having system level privileges. In one example, the mandatory access control policy is provisioned without a system reboot.

21 Claims, 5 Drawing Sheets

(56) References Cited

U.S. PATENT DOCUMENTS

| | | | | |
|---|---|---|---|---|
| 2005/0138423 | A1* | 6/2005 | Ranganathan | G06F 21/305 |
| | | | | 726/4 |
| 2006/0242685 | A1* | 10/2006 | Heard | G06F 21/577 |
| | | | | 726/3 |
| 2009/0013401 | A1 | 1/2009 | Subramanian et al. | |
| 2009/0169017 | A1* | 7/2009 | Smith | G06F 21/57 |
| | | | | 380/278 |
| 2009/0222880 | A1* | 9/2009 | Mayer | G06F 21/604 |
| | | | | 726/1 |
| 2013/0036448 | A1* | 2/2013 | Aciicmez | G06F 21/6218 |
| | | | | 726/1 |
| 2014/0123235 | A1* | 5/2014 | Dewan | G06F 21/53 |
| | | | | 726/4 |
| 2014/0229943 | A1 | 8/2014 | Tian et al. | |
| 2014/0380009 | A1 | 12/2014 | LeMay et al. | |

FOREIGN PATENT DOCUMENTS

| | | | | |
|---|---|---|---|---|
| WO | 2015021547 A1 | 2/2015 | | |
| WO | WO-2015021547 A1 * | 2/2015 | | G06F 8/61 |

OTHER PUBLICATIONS

Kyung-Soo Moon et al., "Chroma Interpolation Using High Precision Filter, FIR Filter, Linear Filter", Journal of Broadcast Engineering, vol. 17, No. 3, May 2012, pp. 480-490, English Abstract.
International Search Report and Written Opinion for International Patent Application No. PCT/US2016/028407, dated Jul. 27, 2016, 10 pages.
European Search Report for European Patent Application 16793136.9, dated Sep. 28, 2018, 9 pages.

* cited by examiner

INTEGRITY PROTECTION OF A MANDATORY ACCESS CONTROL POLICY IN AN OPERATING SYSTEM USING VIRTUAL MACHINE EXTENSION ROOT OPERATIONS

CROSS-REFERENCE TO RELATED APPLICATION

This application claims benefit to U.S. Provisional Patent Application No. 62/161,098 filed May 13, 2015.

TECHNICAL FIELD

Embodiments generally relate to data security. More particularly, embodiments relate to integrity protection of a mandatory access control policy in an operating system using virtual machine extension root operations.

BACKGROUND

Virtualization technology such as, for example, INTEL VT-x may be used in a variety of ways to implement full virtualization of multiple operating systems (OSes). Virtualization technology may also be used to implement anti-virus scanning engines where the engine can be protected from malware threats running with Ring-0 privileges (e.g., the most privileged level of the four (Rings 0-3) privilege levels). Operating systems such as SELINUX, Internet of Things OS (IoT-OS) and Clear LINUX OSes may implement mandatory access control (MAC) mechanisms using security policy modules in the form of a layered security module (LSM). Typically, the LSM may be considered part of the OS trusted computing base (TCB) because the MAC enforcement is performed by the LSM. The LSM may depend on a MAC policy that is usually authored by a system administrator read into kernel memory at system boot time. Occasionally, it may be necessary to modify/update the policy. Typically, updates require a system reboot in order that the new policy signature may be checked/verified using a secure boot mechanism. With always-on requirements of cloud and IoT (Internet of Things) computing, however, it may not be acceptable to conduct reboots. Additionally, MAC mechanisms may be vulnerable to other Ring-0 threads, interrupt handlers and device drivers that may be compromised.

BRIEF DESCRIPTION OF THE DRAWINGS

The various novel aspects of the embodiments of the present disclosure will become apparent to a person of ordinary skill in the art by reading the following enabling specification and appended claims, and by referencing the following drawings, in which:

DESCRIPTION OF EMBODIMENTS

Figure 1:
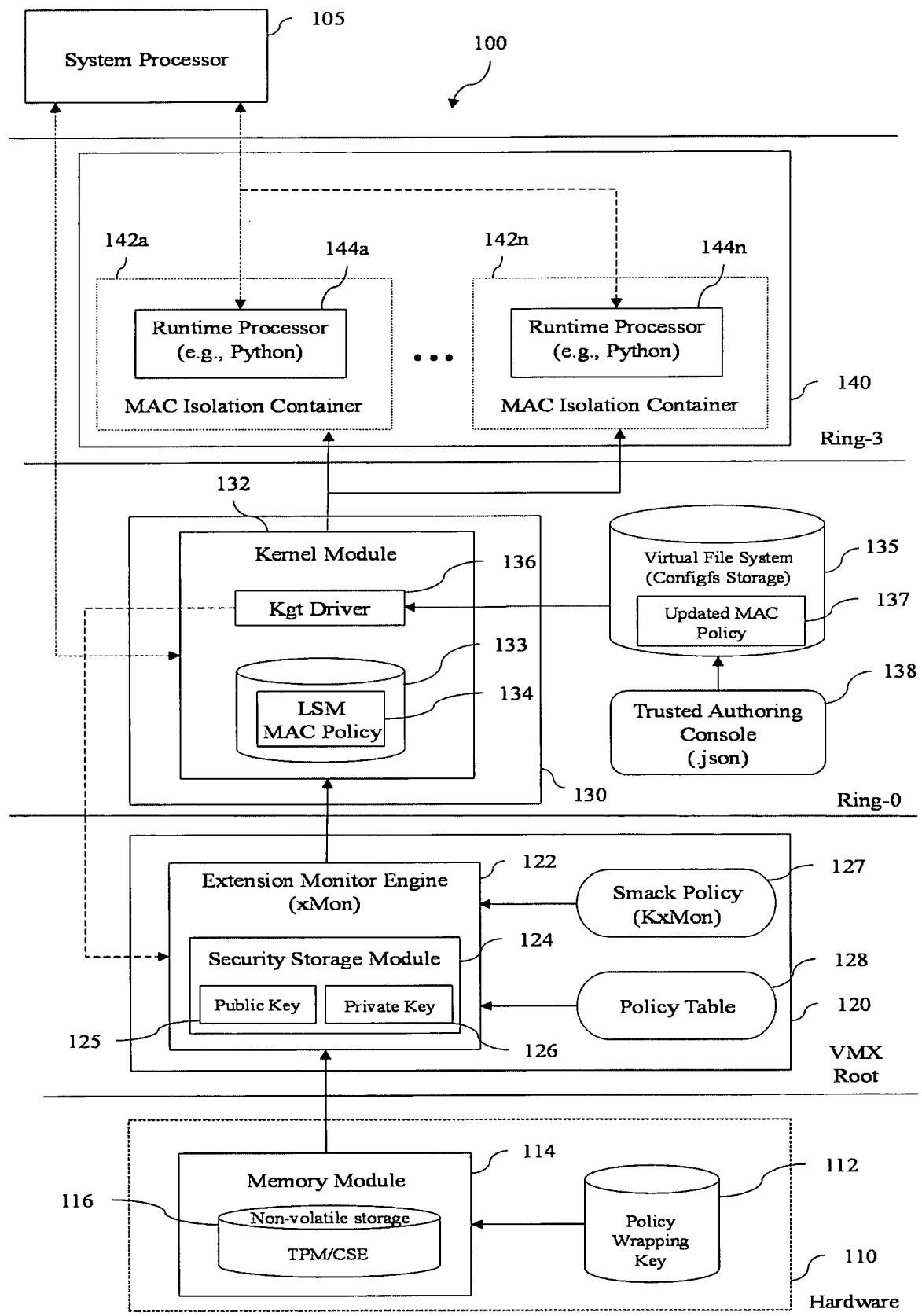
FIG. 1 is a block diagram of an example of a security apparatus according to an embodiment.

Turning now to FIG. 1, a computing data security system 100 that conducts integrity protection of a mandatory access control (MAC) policy in an operating system (OS) using virtual machine extension root (VMXroot) operations is shown. The system 100 may interface with a system processor 105 and may use a VMXroot process (such as, for example, INTEL VT-x) to implement kernel integrity enforcement without requiring reboots to reconfigure MAC policy while protecting layered security module (LSM) components of a kernel from modification by rogue Ring-0 subjects. The system 100 may generally include a hardware component 110, a VMXroot component 120, a Ring-0 privilege level component 130, and a Ring-3 privilege level component 140. The hardware component 110 may include a policy wrapping key 112 and a memory module 114. The policy wrapping key 112 may provide one or more cryptographic keys to the memory module 114. The one or more cryptographic keys may be built from standard primitives (e.g., block ciphers and cryptographic hash functions), and may function to protect the keys from implementations involving unreliable or untrusted storage, or when transmitting the keys over untrusted networks. The memory module 114 may include a non-volatile computer storage medium 116 (e.g., flash memory), and may be used to implement security measures such as a Trusted Platform Module (TPM) which may be used to generate cryptographic keys such as, for example, a cryptographic key 126, to help ensure integrity of the platform. The TPM may utilize a Cipher-based Message Authentication Code (CMAC) module to generate/encrypt the cryptographic key 126. The CMAC module may improve the optimization of the memory module 114 including, for example, helping eliminate instances of common/duplicate expressions.

The VMXroot component 120 may include an operating system-specific extension monitor such as, for example, an extension monitor engine (xMon engine) 122, which may accept instructions as to which Ring-0 objects to monitor. The xMon engine 122 may include a secure storage module 124 that stores a public key 125 and the cryptographic key 126 (e.g., wrap key/KxMon), received from the memory module 114. The VMXroot component 120 may also include a kernel policy module such as, for example, a Simplified Mandatory Access Control Kernel (SMACK) policy (KxMon) module 127, and a policy table 128. The xMon engine 122 may accept instructions as to which Ring-0 objects to monitor using the SMACK policy module 127 and policy table 128. The SMACK policy module 127 may be a kernel security module that protects data and process interaction from malicious attacks or manipulation via a set of custom mandatory access control (MAC) rules. The policy table 128 may describe the system protection policy with respect to the privilege levels and may define the assets and resources that are to be protected, protocols to take in the event of a policy violation, and the like. The integrity of policy table 128 may be verified as part of a secure boot mechanism applied to xMon engine 122. The xMon engine 122 may use dynamic memory protections that monitor kernel resources including computing resources (CRs), model specific register (MSR), and memory events.

The Ring-0 privilege level component 130 may include a kernel module 132 and a driver such as, for example, a Kgt driver 136. The kernel module 132 may include a kernel memory 133 that includes an LSM module that stores a MAC policy, i.e., LSM MAC policy 134. When the illustrated xMon engine 122 runs it obtains a key, such as, for example, the cryptographic key 126, used to sign and/or encrypt the MAC policy. The xMon engine 122 may also obtain a signed and/or encrypted policy from an LSM Policy database (discussed below) that may be exposed to the xMon engine 122 via the Kgt driver 136 utilizing, for example, "Configfs" callbacks. The xMon engine 122 may write the MAC policy into the kernel memory 133 so that the LSM can begin to enforce the organization specific MAC controls defined in the MAC policy. Accordingly, the kernel module 132 may apply the MAC policy to protect one or more isolation container security boundaries such as, for example, MAC isolation containers 142a-n. Other OS processes may be subsequently launched under the control of the MAC policy (i.e., LSM MAC policy 134) of the kernel memory 133. Ring-3 processes, for example, may be run in a container such as, for example, the MAC isolation container 142a-n (discussed below), defined by the MAC policy.

As already noted, the Ring-3 privilege level component 140 may include one or more MAC isolation container(s) 142a-n. The MAC isolation containers 142a-n may be defined by a runtime processor 144a-n (e.g., Python), in communication with the virtual file system 135 to enforce the MAC policy. The MAC isolation containers 142a-n may, for example, trap into the kernel on a security related system call (e.g., an open call) to apply the new MAC policy rules, i.e., updated MAC policy 137. There may be multiple MAC isolation containers, e.g., MAC isolation container 142a-n, that sandbox multiple threads/applications. The sandboxed applications contained in the MAC isolation containers 142a-n may interact, but are required to follow the MAC policy rules. For example, an integrity model (e.g., a BIBA security model), may require a subject (e.g., a sandboxed application) to dominate the integrity level of an object before the subject is authorized to write/modify data in the object. Other models may also optimize for confidentiality, conflicts of interest, and the like. The MAC policy may have exceptions that, for example, authorize a privileged user to override an instance where the MAC policy prevents an operation, but due to extenuating circumstances (i.e., data are manually screened for integrity), the write rule may be overridden.

The MAC policy may be updated via a trusted authoring console 138, which may include policy data in a JavaScript Object Notation (JSON or json) format. An updated policy (LSM policy) may be provisioned/managed by an administrator key from the trusted authoring console 138 and supplied to the Kgt driver 136 via the virtual file system 135. The Kgt driver 136 may forward the updated LSM MAC policy to the xMon engine 122 where it may be verified using a public key such as, for example, the public key 125 that is embedded in the secure storage module 124 of the xMon engine 122. If the policy is verified, a local key (symmetric) may be used to encrypt and/or perform CMAC on the policy for performance reasons. The updated policy may thereby be provisioned (i.e., written) into the kernel memory 133, which may be protected from write operations by other Ring-0 (and above) processes, without requiring reboots to reconfigure the MAC policy while also protecting LSM components of a kernel from modification by rogue Ring-0 subjects. Thus, the reboot functionality of the illustrated system 100 is independent of the extension monitor engine 122. The system 100 may thereby allow for dynamic update of a MAC policy without system reboot, support faster subsequent boot times, and diminish security risk presented by unauthorized privilege level subjects. The system 100 may also allow the xMon engine 122 to enforce a read-only policy over the LSM module of the kernel memory 133 in order to update the MAC policy (without allowing write operations as historically required).

Figure 2A:
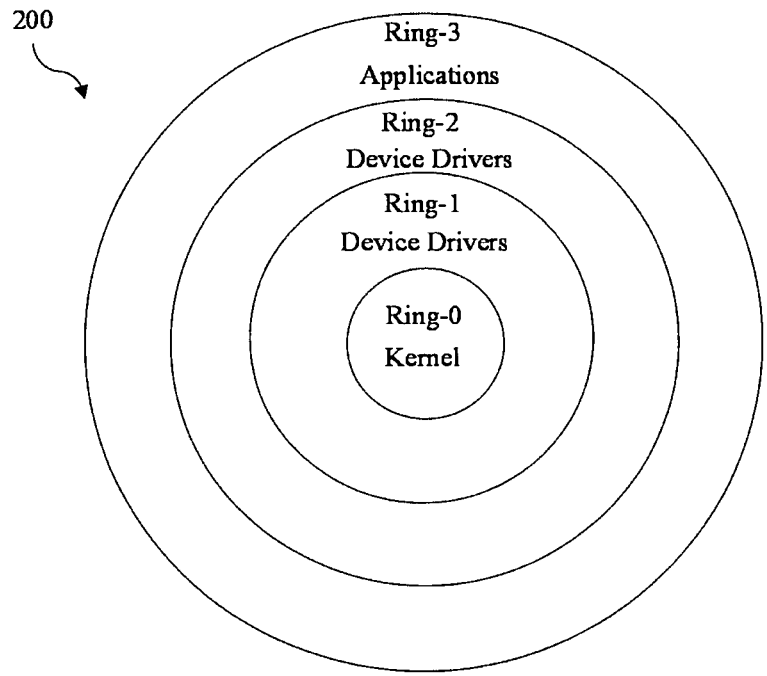
FIGS. 2A-2B are diagrams of examples of security privilege levels according to embodiments.
Figure 2B:
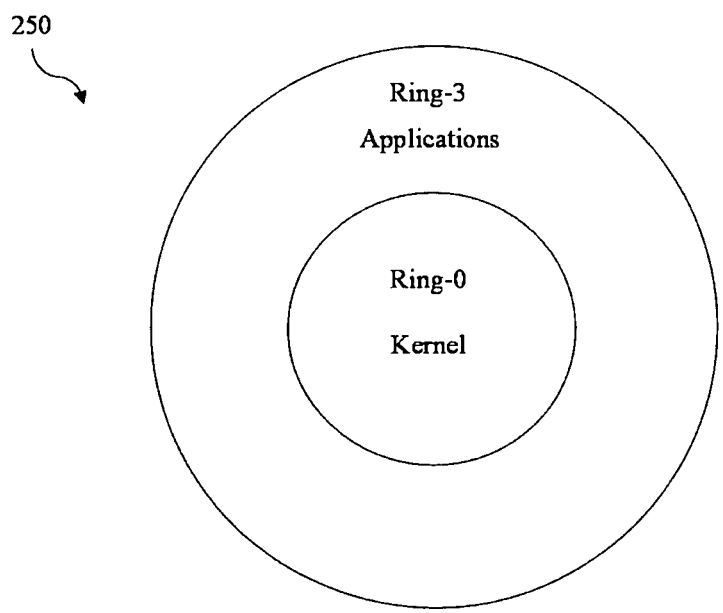

Turning now to FIGS. 2A-2B, examples of security privilege levels for use with the system 100 depicting in FIG. 1, are shown. Privilege levels in the INTEL x86 instruction set architecture (ISA) control the degree of access a program currently running on a processor such as, for example, the system processor 105 (FIG. 1), to system resources, e.g., memory regions, input/output (I/O) ports, and the ability to execute certain special machine instructions. The privilege levels may therefore enable the OS and CPU (central processing unit, host processor) to restrict what user mode programs can do. FIG. 2A depicts an example of privilege levels 200 for use in processors such as, for example, Intel x86 microprocessors. There are four privilege levels ranging from level 0 to level 3, and typically three main resources are protected: memory, I/O ports and the ability to execute certain machine instructions. The privilege levels (0-3) are often referred to as rings or protection rings (0-3) and reflect an inverse relationship with respect to privilege (restriction), i.e., Ring-0 is the most privileged and Ring-3 is the least privileged. Most modern operating systems use Ring-0 for kernel/executive and Ring-3 for application programs. Ring-1 and Ring-2 may typically be used for device drivers. Because Ring-0 defines the highest privilege level, any resource available to level n may also be available to level 0-n. However, when a lower privileged process (e.g., Ring-3) attempts to access a higher privileged process (e.g., Ring-0), a general protection fault may be reported to the OS. FIG. 2B depicts another example of privilege levels 250 for use in processors such as, for example, Intel x86 microprocessors. Because most modern operating systems use only two privilege levels, Ring-0 and Ring-3 (as depicted in FIG. 1), FIG. 2B depicts an example of privilege levels including only Ring-0 and Ring-3. Ring-0 may be used for kernel operations and Ring-3 may be used for application programs. As a result, all user code typically runs in Ring-3 and all kernel code typically runs in Ring-0.

Figure 3:
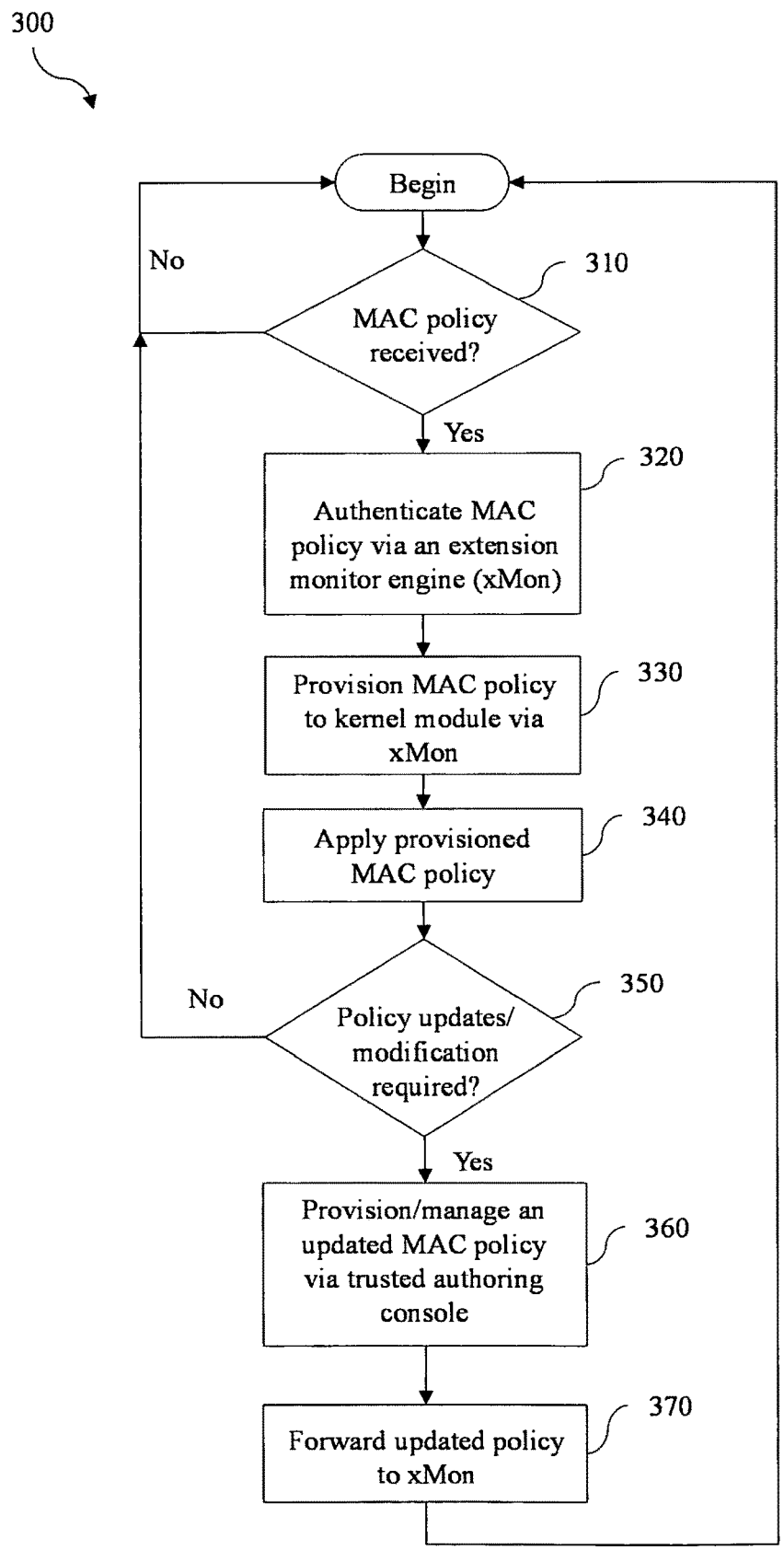
FIG. 3 is a flowchart of an example of a method of operating a security apparatus according to an embodiment.

FIG. 3 provides a flowchart of an example of a method 300 of operating a security apparatus according to an embodiment. The flowchart includes a detailed flow of the configuration and operational steps of the method 300. The method 300 of FIG. 3 may be implemented in one or more modules as a set of logic instructions stored in a machine- or computer-readable storage medium such as random access memory (RAM), read only memory (ROM), programmable ROM (PROM), flash memory, etc., as configurable logic such as, for example, programmable logic arrays (PLAs), field programmable gate arrays (FPGAs), complex programmable logic devices (CPLDs), as fixed-functionality logic hardware using circuit technology such as, for example, application specific integrated circuit (ASIC), complementary metal oxide semiconductor (CMOS) or transistor-transistor logic (TTL) technology, or any combination thereof. The method 300 defines an example of a virtual machine extension root operation for a security apparatus according to an embodiment and may be implemented, for example, with system 100 depicted in FIG. 1.

With continued reference to FIGS. 1 and 3, illustrated processing block 310 provides for determining whether a MAC policy has been received. The MAC policy (e.g., LSM MAC policy) may include, for example, instructions regarding which Ring-0 objects to monitor. The determination may be made via an extension monitor such as, for example, extension monitor engine (xMon engine) 122 based on a kernel policy (e.g., SMACK policy 127) and a policy table (e.g., policy table 128). If a MAC policy is not received at processing block 310, the process returns to "Begin". Otherwise, at illustrated processing block 320 an authentication of the MAC policy is performed via the extension monitor engine utilizing one or more of a public key and a cryptographic key such as, for example, the public key 125 and the cryptographic key 126. At illustrated processing block 330, the MAC policy, e.g., LSM MAC policy 134, may be provisioned to a kernel module such as, for example, the kernel module 132 via, for example, the xMon engine 122 in order to protect/enforce the security boundaries of one or more isolation containers such as, for example, the MAC isolation containers 142*a-n*. At illustrated processing block 340, the MAC policy may be forwarded (i.e., applied) to the one or more MAC isolation containers via a driver such as, for example, the Kgt driver 136 in order to define security boundaries for the MAC isolation containers. At illustrated processing block 350, a determination is made regarding whether policy updates are required. If "No", the process returns to "Begin". If "Yes", at illustrated processing block 360 an updated MAC policy, e.g., updated MAC policy 137, may be provisioned/managed utilizing a runtime process via a trusted authoring console such as, for example, the trusted authoring console 138 in communication with a virtual file system such as, for example, the virtual file system 135. The updated MAC policy may be output via the virtual file system to the extension monitor engine via a driver such as, for example, the Kgt driver 136. The updated MAC policy may be provisioned without requiring a system reboot to reconfigure the policy. At illustrated processing block 370, the updated MAC policy may be forwarded to the extension monitor engine and the process then returns to "Begin". The illustrated method therefore allows a virtual machine extension root component such as, for example, the VMX root 120 including an extension monitor to conduct a signature verification of a MAC policy, provision the MAC policy into a kernel memory if the signature verification is successful, and protect the kernel memory from unauthorized write operations by one or more processes that lack privilege. The virtual machine root component may utilize a virtual machine extension root operation defined at least in part by FIG. 3. Each of the discussed benefits are achieved without requiring the system processor to reboot (e.g., the reboot functionality of the system processor may be independent of the extension monitor).

Figure 4:
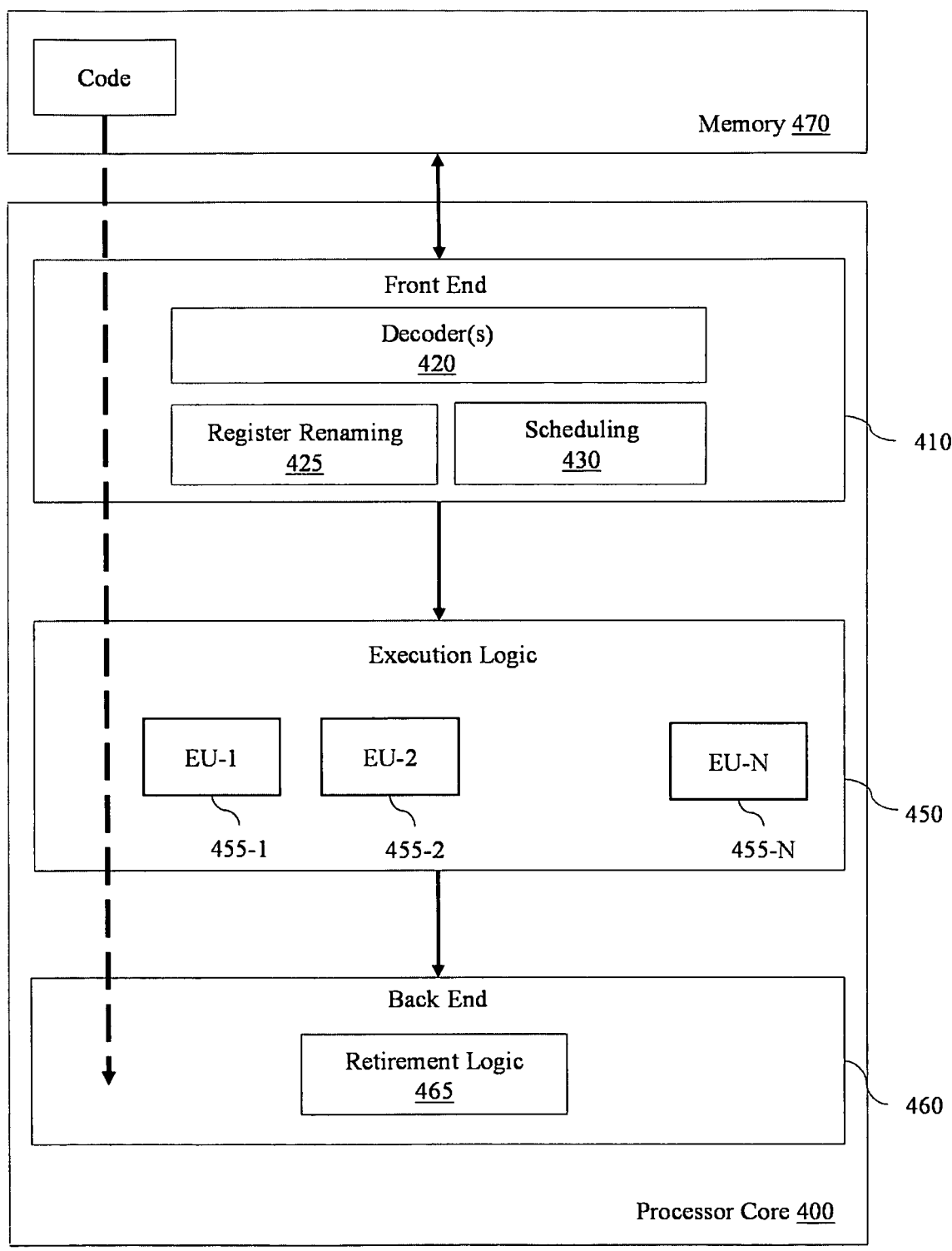
FIG. 4 is a block diagram of an example of a processor according to an embodiment.

FIG. 4 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 4, a processing element may alternatively include more than one of the processor core 400 illustrated in FIG. 4. The processor core 400 may be a single-threaded core or, for at least one embodiment, the processor core 400 may be multithreaded in that it may include more than one hardware thread context (or "logical processor") per core.

FIG. 4 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 300 (FIG. 3), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 250.

Although not illustrated in FIG. 4, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 5:
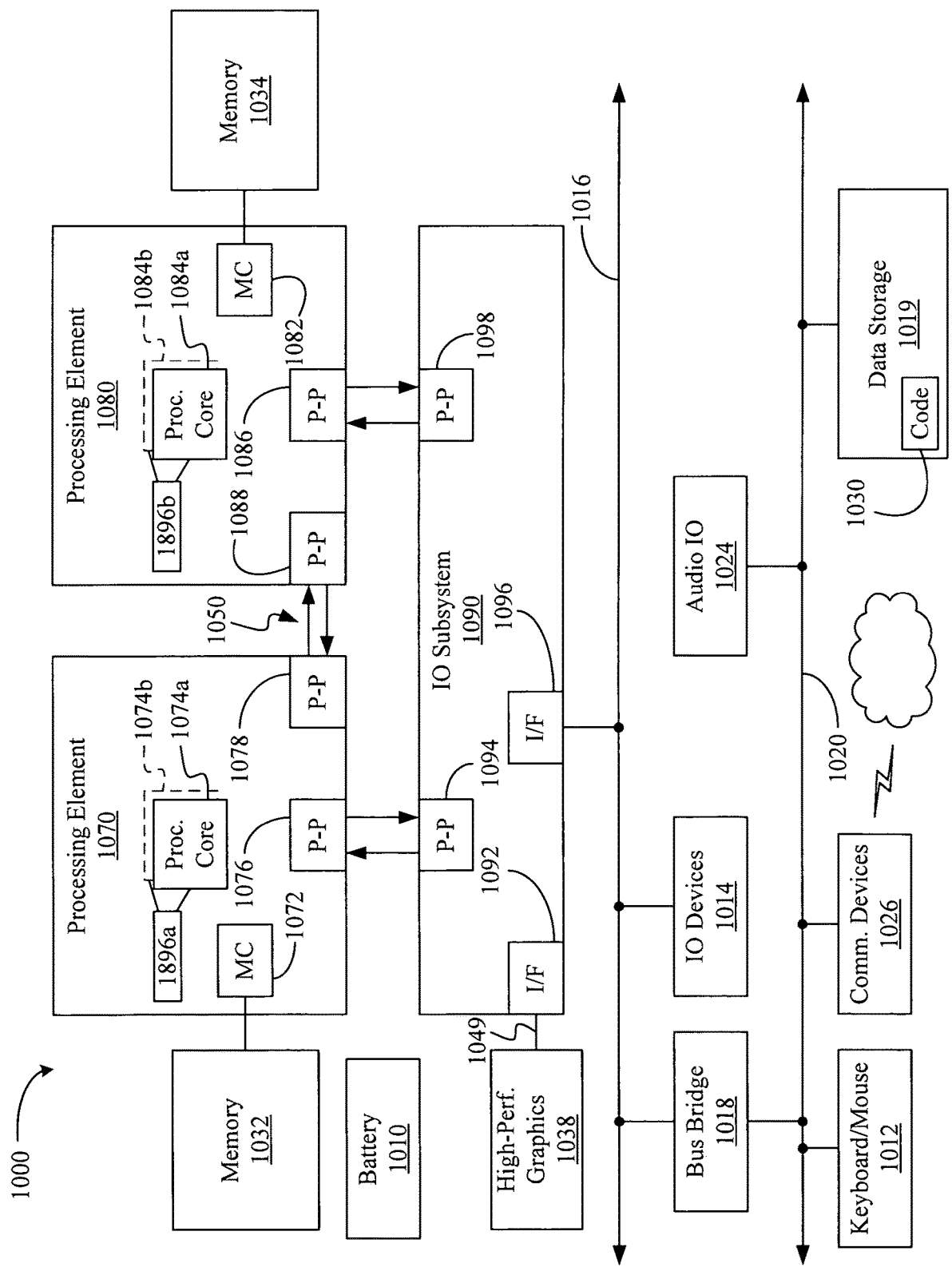
FIG. 5 is a block diagram of an example of a computing system according to an embodiment.

Referring now to FIG. 5, shown is a block diagram of a computing system 1000 embodiment in accordance with an embodiment. The system 1000 (i.e., a multiprocessor system) includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 4.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 300 (FIG. 3), already discussed, and may be similar to the code 413 (FIG. 4), already discussed.

Further, an audio I/O 1024 may be coupled to second bus 1020 and a battery 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

ADDITIONAL NOTES AND EXAMPLES

Example 1 may include a computing data security system including a system processor and a virtual machine extension root component including an extension monitor to conduct a signature verification of a mandatory access control policy, provision the mandatory access control policy into a kernel memory if the signature verification is successful, and protect the kernel memory from unauthorized write operations by one or more processes that lack privilege, wherein the extension monitor does not require the system processor to reboot to configure the policy.

Example 2 may include the system of example 1, wherein the mandatory access control policy is provisioned via a virtual machine extension root component operation.

Example 3 may include the system of example 1, wherein the extension monitor includes a secure storage module to store at least one public key and at least one cryptographic key.

Example 4 may include the system of any one of examples 1 or 3, wherein the extension monitor is to receive a SMACK policy and a policy table, and update the mandatory access control policy based at least in part on the SMACK policy and the policy table.

Example 5 may include the system of example 1, wherein a first privilege level component includes a kernel module to store a mandatory access control policy, and a kernel driver to provide the mandatory access control policy to the extension monitor.

Example 6 may include the system of example 5, wherein the first privilege level component includes a trusted authoring console to provision an updated mandatory access control policy, and a virtual file system to output the updated mandatory access control policy to the extension monitor.

Example 7 may include the system of example 5, wherein a second privilege level component includes one or more mandatory access control isolation containers each including a runtime processor to receive updates to the mandatory access control policy, wherein each of the mandatory access control isolation containers is to enforce a security boundary.

Example 8 may include the system of example 1, wherein the second privilege level includes a hardware component including a memory module to provide a policy wrapping key to the extension monitor.

Example 9 may include at least one computer readable storage medium including a set of instructions, which when executed by a computing system, cause the computing system to conduct a signature verification of a mandatory access control policy, provision the mandatory access control policy into a kernel memory if the signature verification is successful, and protect the kernel memory from unauthorized write operations by one or more processes that lack privilege.

Example 10 may include the medium of example 9, wherein the instructions, when executed, cause the computing device to update the mandatory access control policy without a system reboot.

Example 11 may include the medium of example 9, wherein the instructions, when executed, cause the computing device to provision the mandatory access control policy via a virtual machine extension root operation.

Example 12 may include the medium of any one of examples 9 or 11, wherein the instructions, when executed, cause the computing device to receive a SMACK policy and a policy table, and update the mandatory access control policy based at least in part on the SMACK policy and the policy table.

Example 13 may include the medium of example 12, wherein the instructions, when executed, cause the computing device to store the mandatory access control policy, and provide the mandatory access control policy to an extension monitor.

Example 14 may include the medium of example 13, wherein the instructions, when executed, cause the computing device to provision an updated mandatory access control policy, and output the updated mandatory access control policy to the extension monitor.

Example 15 may include the medium of any one of examples 13 or 14, wherein the instructions, when executed, cause the computing device to receive updates to the mandatory access control policy to enforce one or more security boundaries.

Example 16 may include a method of operating a computing data security system including conducting a signature verification of a mandatory access control policy, provisioning the mandatory access control policy into a kernel memory if the signature verification is successful, and protecting the kernel memory from unauthorized write operations by one or more processes that lack privilege.

Example 17 may include the method of example 16, wherein the mandatory access control policy is updated without a system reboot.

Example 18 may include the method of example 16, wherein the mandatory access control policy is provisioned via a virtual machine extension root operation.

Example 19 may include the method of any one of examples 16 or 18, including receiving a SMACK policy and a policy table, and updating the mandatory access control policy based at least in part on the SMACK policy and the policy table.

Example 20 may include the method of example 16, including storing the mandatory access control policy, and providing the mandatory access control policy to an extension monitor.

Example 21 may include the method of example 20, including provisioning an updated mandatory access control policy, and providing the updated mandatory access control policy to the extension monitor.

Example 22 may include the method of any one of examples 20 or 21, including receiving updates to the mandatory access control policy to enforce one or more security boundaries.

Example 23 may include a computing data security apparatus including a virtual machine extension root component including an extension monitor to conduct a signature verification of a mandatory access control policy, provision the mandatory access control policy into a kernel memory if the signature verification is successful, and protect the kernel memory from unauthorized write operations by one or more processes that lack privilege, wherein the extension monitor does not require a system processor to reboot to configure the mandatory access control policy.

Example 24 may include the apparatus of example 23, wherein the mandatory access control policy is provisioned via a virtual machine extension root component operation.

Example 25 may include the apparatus of example 23, wherein the extension monitor includes a secure storage module to store at least one pubic key and at least one cryptographic key.

Example 26 may include the apparatus of any one of examples 23 or 25, wherein the extension monitor is to receive a SMACK policy and a policy table, and update the mandatory access control policy based at least in part on the SMACK policy and the policy table.

Example 27 may include the apparatus of example 23, including a first privilege level component having a kernel module to store the mandatory access control policy, and provide the mandatory access control policy to the extension monitor.

Example 28 may include the apparatus of example 27, wherein the first privilege level component includes provisioning an updated mandatory access control policy, and providing the updated mandatory access control policy to the extension monitor.

Example 29 may include the apparatus of any one of examples 27 or 28, including a second privilege level component having one or more mandatory access control isolation containers each including a runtime processor to receive updates to the mandatory access control policy, wherein each of the mandatory access control isolation containers is to enforce a security boundary.

Example 30 may include the apparatus of example 23, including a hardware component including a memory module to provide a policy wrapping key to the extension monitor.

Example 31 may include a computing data security apparatus including means for conducting a signature verification of a mandatory access control policy, means for provisioning the mandatory access control policy into a kernel memory if the signature verification is successful, and means for protecting the kernel memory from unauthorized write operations by one or more processes that lack privilege, wherein the apparatus does not require a system reboot.

Example 32 may include the apparatus of example 31, wherein the mandatory access control policy is provisioned via means for virtual machine extension root operation.

Example 33 may include the apparatus of example 31, including means for secure storage to store at least one public key and at least one cryptographic key.

Example 34 may include the apparatus of any one of examples 31 or 33, including means to receive a SMACK policy and a policy table, and means to update the mandatory access control policy based at least in part on the SMACK policy and the policy table.

Example 35 may include the apparatus of example 31, including means for storing a mandatory access control policy, and means for providing the mandatory access control policy to the means for virtual machine extension root operation.

Example 36 may include the apparatus of example 35, including means for provisioning an updated mandatory access control policy, and means for outputting the updated mandatory access control policy to the means for virtual machine extension root operation.

Example 37 may include the apparatus of any one of examples 35 or 36, including one or more mandatory access control isolation container means to receive updates to the mandatory access control policy, wherein each of the mandatory access control isolation container means is to enforce a security boundary.

Example 38 may include the apparatus of example 31, including memory means to provide a policy wrapping key to the extension monitor.

Techniques described herein may therefore use an extension monitor (xMon) in a VMXroot environment to provide several significant advantages including, but not limited to, protecting the integrity of an LSM, provisioning (writing) a LSM policy to kernel memory, protecting an LSM policy using wrapping/signing keys available only to the xMon, protecting other kernel resources, and enforce Ring-3 containers following a MAC policy.

Additionally, xMon may be used in a VMXroot environment to separate kernel TCB into a read-only and a write-only partitioning where a VMXroot process retains write authority, wherein violations of write-protected memory can result in a kernel fault. Moreover, techniques described herein may be used to implement containers for cloud and IoT applications that are hardened from Ring-0 attacks to the LSM which is a TCB resource.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a system hardware processor; and
a virtual machine extension root component including an extension monitor to:
conduct a signature verification of a mandatory access control policy;
provision the mandatory access control policy into a kernel memory if the signature verification is successful, wherein the kernel memory includes a layered security module to store and enforce the mandatory access control policy; and
protect the kernel memory from unauthorized write operations by one or more processes that lack privilege,
wherein the extension monitor is to receive a simplified mandatory access control kernel (SMACK) policy and a policy table, and update the mandatory access control policy based at least in part on the SMACK policy and the policy table, and wherein the extension monitor is to be independent of reboot functionality of the system processor to enable dynamic update of a mandatory access control policy without requiring the system processor to reboot, thereby protecting components of the layered security module from modification by rogue or unauthorized privilege level subjects.

2. The system of claim 1, wherein the mandatory access control policy is provisioned via a virtual machine extension root component operation.

3. The system of claim 1, wherein the extension monitor includes a secure storage module to store at least one public key and at least one cryptographic key.

4. The system of claim 1, further comprising:
a first privilege level component including:
a kernel module to store the mandatory access control policy; and
a kernel driver to provide the mandatory access control policy to the extension monitor.

5. The system of claim 4, wherein the first privilege level component further includes:
a trusted authoring console to provision an updated mandatory access control policy; and
a virtual file system to output the updated mandatory access control policy to the extension monitor.

6. The system of claim 4, further comprising:
a second privilege level component including:
one or more mandatory access control isolation containers each including a runtime processor to receive updates to the mandatory access control policy, wherein each of the mandatory access control isolation containers is to enforce a security boundary.

7. The system of claim 1, further comprising a hardware component including a memory module to provide a policy wrapping key to the extension monitor.

8. At least one non-transitory computer readable storage medium comprising a set of instructions, which when executed by a computing device, cause the computing device to:
conduct a signature verification of a mandatory access control policy;
provision the mandatory access control policy into a kernel memory if the signature verification is successful, wherein the kernel memory includes a layered security module that stores and enforces the mandatory access control policy;
protect the kernel memory from unauthorized write operations by one or more processes that lack privilege; and
receive, via an extension monitor, a simplified mandatory access control kernel (SMACK) policy and a policy table, and update the mandatory access control policy based at least in part on the SMACK policy and the policy table,
wherein the extension monitor is to be independent of reboot functionality to enable dynamic update of a mandatory access control policy without requiring a reboot, to protect components of the layered security module from modification by rogue or unauthorized privilege level subjects.

9. The at least one non-transitory computer readable storage medium of claim 8, wherein the instructions, when executed, cause the computing device to update the mandatory access control policy without a system reboot to configure the policy.

10. The at least one non-transitory computer readable storage medium of claim 8, wherein the instructions, when executed, cause the computing device to provision the mandatory access control policy via a virtual machine extension root operation.

11. The at least one non-transitory computer readable storage medium of claim 8, wherein the instructions, when executed, cause the computing device to:
store the mandatory access control policy; and
provide the mandatory access control policy to an extension monitor.

12. The at least one non-transitory computer readable storage medium of claim 11, wherein the instructions, when executed, cause the computing device to:
provision an updated mandatory access control policy; and
output the updated mandatory access control policy to the extension monitor.

13. The at least one non-transitory computer readable storage medium of claim 11, wherein the instructions, when executed, cause the computing device to receive updates to the mandatory access control policy to enforce one or more security boundaries.

14. A method comprising:
conducting a signature verification of a mandatory access control policy;
provisioning the mandatory access control policy into a kernel memory if the signature verification is successful, wherein the kernel memory includes a layered security module to store and enforce the mandatory access control policy;
protecting the kernel memory from unauthorized write operations by one or more processes that lack privilege; and
receive, via an extension monitor, a simplified mandatory access control kernel (SMACK) policy and a policy table, and update the mandatory access control policy based at least in part on the SMACK policy and the policy table,
wherein the extension monitor is to be independent of reboot functionality to enable dynamic update of a mandatory access control policy without requiring a reboot, to protect components of the layered security module from modification by rogue or unauthorized privilege level subjects.

15. The method of claim 14, wherein the instructions, wherein the mandatory access control policy is updated without a system reboot.

16. The method of claim 14, wherein the mandatory access control policy is provisioned via a virtual machine extension root operation.

17. The method of claim 14, further including:
storing the mandatory access control policy; and
providing the mandatory access control policy to an extension monitor.

18. The method of claim 17, further including:
provisioning an updated mandatory access control policy; and
providing the updated mandatory access control policy to the extension monitor.

19. The method of claim 14, further including receiving updates to the mandatory access control policy to enforce one or more security boundaries.

20. An apparatus comprising:
a virtual machine extension root component, implemented in logic hardware, including an extension monitor to:
conduct a signature verification of a mandatory access control policy;
provision the mandatory access control policy into a kernel memory if the signature verification is successful, wherein the kernel memory includes a layered security module to store and enforce the mandatory access control policy; and
protect the kernel memory from unauthorized write operations by one or more processes that lack privilege,
wherein the extension monitor is to receive a simplified mandatory access control kernel (SMACK) policy and a policy table, and update the mandatory access control policy based at least in part on the SMACK policy and the policy table, and wherein the extension monitor is to be independent of reboot functionality thereby protecting components of the layered security module from modification by rogue or unauthorized privilege level subjects.

21. The apparatus of claim 20, further comprising:
a first privilege level component including:
a kernel module to store a mandatory access control policy;
a kernel driver to provide an updated mandatory access control policy to the extension monitor;
a trusted authoring console to provision an updated mandatory access control policy; and
a virtual file system to output the updated mandatory access control policy to the extension monitor;
a second privilege level component including:
one or more mandatory access control isolation containers each including a runtime processor to receive updates to the mandatory access control policy, wherein each of the mandatory access control isolation containers is to enforce a security boundary; and
a hardware component including a memory module to provide a policy wrapping key to the extension monitor.

* * * * *